Sept. 28, 1937.   C. A. SAWTELLE   2,094,109
LEVER MECHANISM
Filed Aug. 28, 1935   2 Sheets-Sheet 1
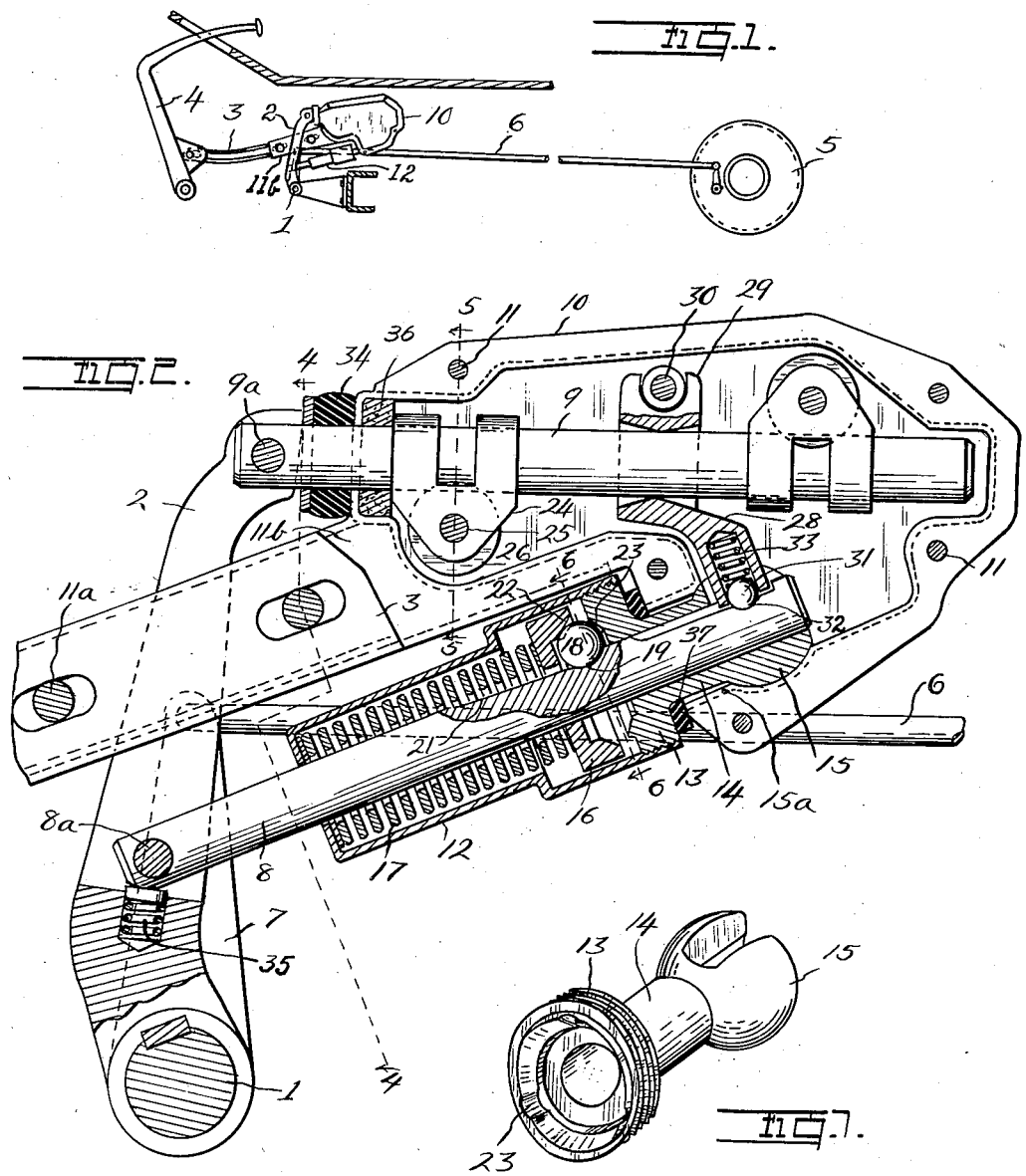
INVENTOR
Charles A. Sawtelle
BY
J. S. Murray
ATTORNEY

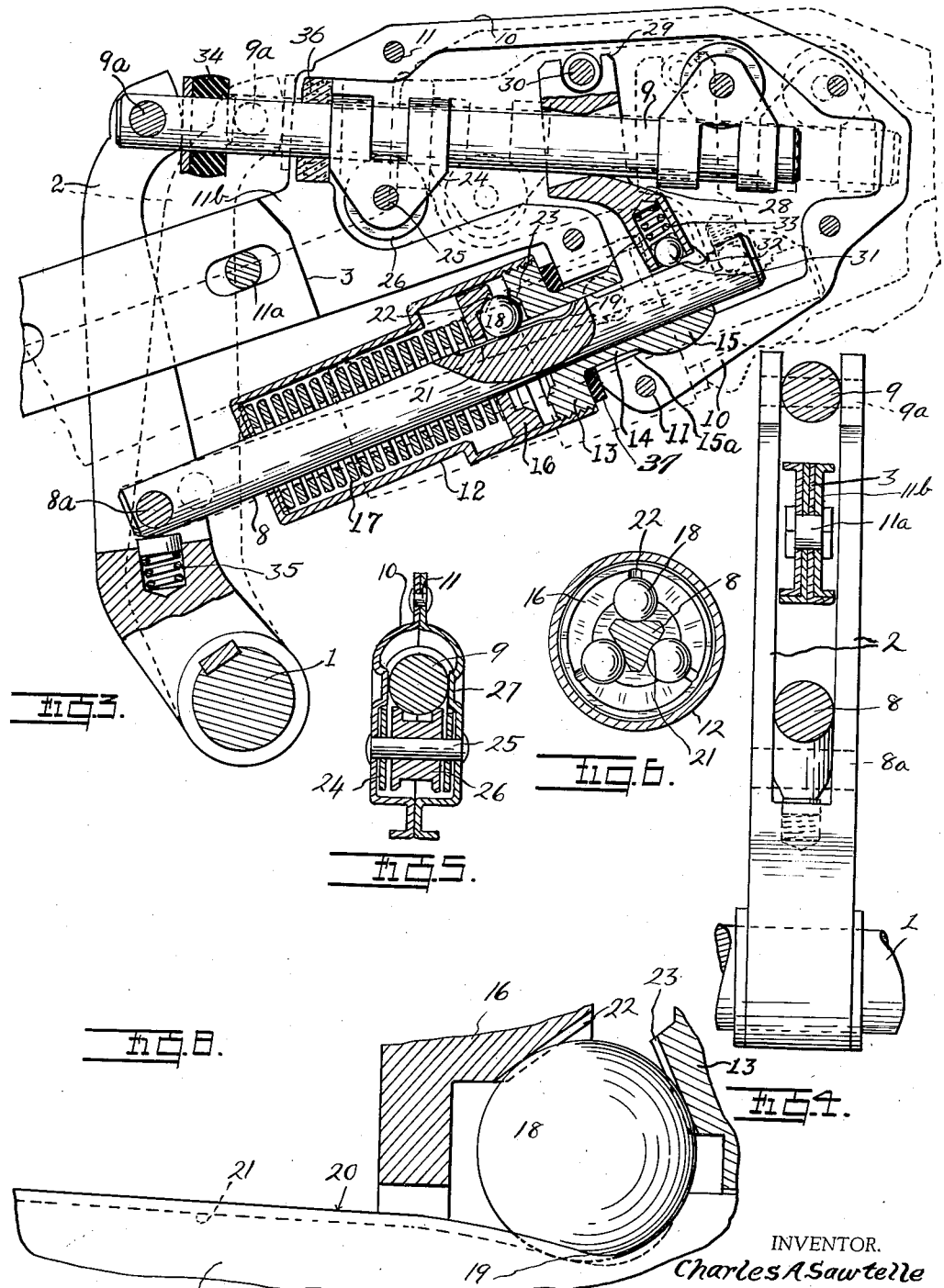

Patented Sept. 28, 1937

2,094,109

UNITED STATES PATENT OFFICE 2,094,109

LEVER MECHANISM

Charles A. Sawtelle, Detroit, Mich., assignor to S. & D. Engineering Company, Detroit, Mich., a corporation of Michigan Application August 28, 1935, Serial No. 38,222

19 Claims. (Cl. 188—196)

This invention relates to lever mechanisms, and particularly to mechanisms which automatically afford a definite increase of leverage, responsive to a predetermined increase of load.

The invention is particularly adapted to the control of brakes, permitting lost motion and clearance to be taken up, under low leverage, responsive to a moderate pedal travel, and increasing the leverage and required pedal travel, as the brake takes effect.

An object of the invention is to effect a sufficiently gradual change from low to high leverage, as to avoid any resulting interference with control by the operator. An abrupt increase of leverage would entail a sudden reduction of resistance at the pedal (or other operating member), to the applied force, and would not afford opportunity to regulate the applied force to satisfy the change of leverage.

Another object of the invention is to provide for actuation of a lever by a pull rod or other tension member, through alternative driving elements, affording differential leverages, and transmitting compression stresses.

A further object is to provide an improved clutch connection between a rod and a member slidable on said rod, one actuating the other, said connection maintaining a fixed driving relation between the member and rod under stresses less than a predetermined maximum, and allowing relative sliding of the members and rod when said maximum is reached.

A still further object is to effect an automatic increase of leverage in a lever mechanism, under a predetermined load increase, and to assure safe operation of said mechanism, if the automatic feature fails to function, for any reason.

These and various other objects, the invention attains by the construction hereinafter described and illustrated in the accompanying drawings, wherein:

Fig. 1 is a side elevational view of the lever mechanism, serving as an actuating connection between a brake pedal and a rear wheel brake.

Fig. 2 is a longitudinal vertical, sectional view of the lever mechanism, showing the normal or non-braking position of the parts.

Fig. 3 is a similar view, showing in full lines the position of the parts, when the brake is actually applied, and showing in dash lines an intermediate position assumed by the parts in taking up slack and clearance.

Fig. 4 is a vertical sectional view, taken upon the line 4—4 of Fig. 2, particularly showing the lever.

Fig. 5 is a cross-sectional view of a push rod and coacting guide unit, taken on the line 5—5 of Fig. 2.

Fig. 6 is a cross-section, taken on the line 6—6 of Fig. 2, showing a multiple ball clutch, associated with another push rod.

Fig. 7 is a perspective view of a unit comprising a cylinder head, ball member, and connecting shank, which is also associated with the last mentioned push rod.

Fig. 8 is a fragmentary elevational view, partially in section, showing certain details of said multiple ball clutch.

In these views, the reference character 1 designates a rock-shaft and 2 a lever, fast upon and upwardly projecting from said shaft. Said lever is actuable by a link or pull rod 3, leading to any suitable actuating element, as for example, a vehicle brake pedal 4. The rock shaft 1 serves to actuate any desired mechanism, as for example, a brake 5, connected by the usual pull rod 6 to an arm 7, fixed on said shaft.

The pull rod 3 acts upon the lever 2 through either of two divergent push rods 8 and 9, pivoted to the lever at 8a and 9a. The points 8a and 9a are unequally distant from the shaft 1, affording the rod 8 a much shorter lever arm than that of the rod 9. Preferably the lever 2 is forked, its furcations being joined some distance above the shaft 1, the pull rod 3 freely extending between the furcations. Also the forward ends of the rods 8 and 9 extend between said furcations for pivotal connection to the lever.

The rods 8 and 9 are supported upon and extend within a casing 10, formed preferably of two sheet-metal stampings, meeting in the plane common to the axes of said rods. Said stampings are held in complementary relation by bolts 11, or other suitable fastenings, engaging flanged margins of the stampings.

The casing 10 is rigidly secured to the rear end of the pull rod 3 by bolts 11a, which clamp the pull rod between tongues 11b, forwardly projecting from said stampings.

Slidable on the rod 8, between the lever 2 and casing 10, is a cylinder 12, having screwed into its rear end a head 13, from which a tubular shank 14 projects into the casing, being formed within the latter with a ball member 15. The rod 8 passes slidably through said head, shank and ball member.

The opening 15a of the casing, accommodating the shank 14, affords the latter adequate clearance to permit a slight angular play, as will hereinafter more fully appear.

Slidable within the cylinder 12, adjacent to the head 13, is a ring 16, which is urged toward said head with considerable force by a spring 17, coiled in the forward portion of said cylinder. The ring 16 and head 13 present conically beveled faces to a plurality of ball detents 18, engaged between said ring and head, whereby the thrust exerted by the spring 17, and also any forward actuation of the casing, urges said detents firmly against the rod 8. In the normal position of the mechanism each ball detent (whereof three are employed in the illustrated structure) engages in a shallow pocket 19 formed in the rod 8, at the rear end of a runway 20 formed as a bevel in said rod. The three runways are preferably spaced equidistantly around the rod 8, and gradually converge toward the rod axis, from their forward to their rear ends, and each is preferably formed with a shallow groove 21, wherein the detents travel. It is further preferred to form notches 22 and 23 in the ring 16 and head 13 to accommodate said detents and accurately maintain their coacting relation with the runway grooves and pockets 19.

In the upper portion of the casing 10, is mounted the push rod 9, with its forward portion projecting to engage the lever 2. Said rod is slidable in a pair of guide units, each comprising a U-shaped sheet-metal member 24, secured at its extremities to the casing by a pin 25, and a grooved roller 26 journaled on said pin. The sides of each member 24 have openings receiving indentations 27 of the casing (see Fig. 5) whereby said members are restrained from swinging about said pins.

Between said guide units, the rod 9 is engaged by a clutch member 28, having in its upper portion an opening through which the rod passes. Said opening is gradually flared from its mid portion to its ends, the rod being normally freely slidable through the central restriction of the opening, without material radial play. Lugs 29, surmounting said clutch member, engage a pin 30 carried by the casing, and establish an axis transverse to the rod 9, about which the clutch member may swing to a limited degree, under certain conditions. Said clutch member, at its lower end, closely approaches the push rod 8, and is formed with a socket, from which projects a ball detent 31 to engage in a notch 32 in the rod 8. A spring 33, coiled in said socket, urges said detent against the rod 8, holding it normally in said notch.

It is preferred to subject the push rod 8, at its end engaging the pin 8a, to upward pressure of a spring 35, to prevent undue play between said rod and pin. As illustrated said spring is socketed in the lever 2 at the juncture of the furcations of the lever.

In the use of the described mechanism, when lost motion and clearance is being taken up, responsive to initial pedal travel, the stress transmitted to the lever 2 is not sufficient to overcome the spring 17, and consequently the detents 18 remain in the pockets 19, causing the rod 8 to be carried forward with the casing 10, actuating the lever with a relatively short leverage arm, established at 8a. This brings the lever to the dash line position of Fig. 3, the rod 9 sliding freely through the guide units 24, 26 and clutch member 28.

As the brake takes effect, the stress transmitted is largely increased, and the spring 17 yields, allowing the detents 18 to be carried by the head 13 out of the pockets 19, and up the incline of the runways 20, as appears in Fig. 3, in full lines.

Advancement of the casing 10, relative to the rod 8, initially effects a tilting of the clutch member 28 such as to lock said member in a driving engagement with the push-rod 9, (see Fig. 3). Thereupon said rod is carried forward in unison with the casing, and the applied force acts upon the lever at the point 9a, with a leverage arm greatly increased over that which was initially effective. Under these conditions, the cylinder 12 slides upon the rod 8, since its rate of forward travel exceeds that of said rod, but this sliding is not entirely free, since advance of the detents 18 is opposed by the inclination of the runways 20.

It is here to be noted that the runways have accurately curved contours, as best appears in Fig. 8, such as to gradually reduce the resistance offered to the advancing detents. That is to say, the angularity of said runways to the rod axis gradually diminishes as the depth of said runways decreases, whereby the rod 8 is not abruptly relieved of driving stress, but this stress is progressively reduced, being at the same time transferred through the clutch member 28 to the rod 9. Consequently, the operator is afforded sufficient opportunity to adjust the pressure, applied at the pedal 4, to accord with the increasing leverage, and there is avoided the feeling of insecurity that an abrupt decrease in pedal resistance would tend to induce.

As the parts return to their normal position, responding to the usual spring (not shown), the bumper 34 absorbs the shock and sound of impact between the lever and casing.

It is preferred to pack grease in the casing 10 to insure lubrication of the parts therein over a long period, and a packing ring 36, surrounding the rod 9, within the casing, may be held against the wall through which said rod projects to prevent withdrawal of lubricant. The ball member 15 performs a like function in connection with the rod 8, at the same time permitting said rod together with the cylinder 12 such slight angular travel relative to the casing as is obviously required by such a mechanism.

A packing ring 37 of rubber or like yieldable material snugly embraces the shank 14 and is snugly engaged between the head 13 and the casing 10 to establish sufficient clearance for the necessary slight angular play of the shank in the casing while restraining the shank and parts carried thereby from axial play.

While any failure of the intended automatic operation is quite unlikely, it is to be noted that if such failure occurs, the lever 2 will, nevertheless, effectively respond to the pull rod 3, since the casing 10 will then engage the rear end of the push rod 9 to transmit the braking effort. This feature derives from the use of compression elements, namely, the push rods 8 and 9, to transmit the desired drive to the lever, as does likewise a desirable simplicity and compactness of design.

The invention is presented as including all such modifications and changes as come within the scope of the following claims.

What I claim is:

1. A lever mechanism comprising a lever, a pull rod for actuating said lever, two elements engaging the lever at unequal distances from its pivot and establishing alternative drive connections to the lever from said pull rod, and a support for said elements, rigidly carried upon the rear end of said pull rod.

2. A lever mechanism comprising a lever, a pull rod for actuating said lever, a push rod pivoted to the lever for driving the lever from said pull rod, a second push rod pivoted to the lever more remotely from its pivot, for driving the lever from said pull rod, and means for automatically transferring the drive from the first-named to the last-named push rod, responsive to a predetermined increase in the stress transmitted.

3. A lever mechanism comprising a pivoted lever, a pull rod extending freely past said lever, and a pair of push rods forming alternative drive connections from said pull rod to the lever, and effective upon the lever at unequal distances from its pivot.

4. A lever mechanism comprising a bifurcated lever, a pull rod extending freely between the furcations of said lever, and a pair of push rods forming alternative drive connections from said pull rod to the lever, and pivotally engaged with the lever between the furcations of the lever and at unequal distances from the pivot of the lever.

5. A lever mechanism comprising a lever, a tension member extending freely past the lever, two members for alternatively transmitting a driving thrust to said lever from the tension member, affording the tension member unequal leverages, and means for automatically shifting over from the lesser to the greater leverage connection, responsive to a predetermined increase in the stress transmitted.

6. A lever mechanism comprising a lever, a rod for driving said lever, a drive connection from said rod to said lever, a casing into which said rod extends, a guide roller engaging the rod within the casing, a pin carried by the casing and journaling said roller, and a guide member for the rod mounted on said pin and supplementing said roller, said member having an opening adjacent to a wall of said casing, and the casing having an indentation engaged in said opening to supplement said pin, in positioning said guide member.

7. A lever mechanism comprising a lever, two push rods connected to the lever at unequal distances from its pivot, and convergently extending from the lever, a member for alternatively driving the push rods, means carried by said member for guiding the rods in a sliding travel relative to said member, said means affording one of said rods a limited angular play relative to said member, and clutch means carried by said member, effective upon said rods, to drive the lever through the rod affording a lesser leverage, in transmitting stresses below a certain limit, and through the rod affording greater leverage in transmitting stresses above said limit.

8. A lever mechanism comprising a lever, a member for actuating said lever, two rods establishing alternative drive connections to said lever from said member, engaging the lever at unequal distances from its pivot, to afford differential leverages, a clutch connection between said member and the rod affording a lesser leverage, engaging the rod between said member and the lever, and yieldable under a predetermined stress, and a clutch connection between said member and the rod affording a higher leverage, effective through relative travel of the lower leverage rod and said member.

9. A clutch connection comprising a rod having a face inclined to its axis, a detent freely engaging said face, a pair of members mounted on the rod, at opposite sides of said detent, and movable longitudinally of the rod, a spring urging one of said members toward the other, said members having detent-engaging faces, so inclined to the rod axis as to urge the detent against said face of the rod responsive to said spring, and means for imposing a driving stress upon said connection, against the thrust of said spring.

10. A clutch connection comprising a rod having a plurality of faces similarly inclined to its axis, detents each freely engaging one of said faces, a pair of members mounted upon said rod at opposite sides of said detents, and movable longitudinally of the rod, a spring urging one of said members toward the other, said members having detent-engaging faces so coned as to urge said detents against said faces of the rod responsive to said spring, and means for imposing a driving stress upon said connection, against the thrust of said spring.

11. A clutch connection comprising a rod having a face inclined to its axis and having its inclination gradually increased as it extends toward said axis, a detent freely engaging said face, a pair of members apertured to receive said rod, and disposed at opposite sides of said detent, and movable longitudinally of the rod relative to each other and to the rod, a spring urging one of said members toward the other, one of said members having a detent-engaging face so inclined to the rod axis as to urge the detent against said face of the rod responsive to said spring, and means for imposing a driving stress upon said connection against the thrust of said spring.

12. A lever mechanism comprising a lever, a rod for actuating the lever, an actuating connection from the rod to the lever, a support on which the rod is slidable, a guide roller engaging the rod, at one side thereof, a pin carried by the support and journaling the roller, and a guide member for the rod pivoted on the pin and engaging a side of the rod opposed to that engaged by the roller.

13. A lever mechanism comprising a lever, two elements establishing alternative drive connections to such lever and affording different leverages, a common support for said elements, an actuating member for both elements, operatively engaging said support between such elements, and means carried by the support for automatically shifting over from the lesser to the greater leverage connection, responsive to a predetermined increase in the stress transmitted.

14. A lever mechanism comprising a pivoted lever, a pair of push rods forming alternative drive connections to such lever and effective on the lever at unequal distances from its pivot, an actuating member interconnecting the push rods, means upon such member for automatically shifting over from the lesser to the greater leverage connection responsive to a predetermined increase in the stress transmitted, and means for shifting the actuating member toward the lever to actuate the latter.

15. A lever mechanism comprising a lever, an actuating member for the lever, two drive connections from such member to the lever, affording unequal leverages, and means for automatically shifting over from the lesser to the greater leverage connection upon a predetermined increase in the stress applied, and for automatically prolonging the shift over to avoid an abrupt leverage variation.

16. A lever mechanism comprising a lever, a pair of elements connected to the lever at unequal distances from its pivot, a member for actuating the lever through either or both of said elements, and clutch connections between said member and elements, automatically effective upon a predetermined increase in the stress applied by said member to merge the declutching of the lesser leverage connection with the clutching of the greater leverage connection to avoid an abrupt leverage variation.

17. A lever mechanism comprising a lever, two push rods connected to the lever at unequal distances from its pivot, and convergently extending from the lever, and mechanism for actuating the lever through such rods including two clutches, one normally effective on the rod affording lesser leverage and yieldable under predetermined stress, and the other associated with the rod affording greater leverage, and taking effect upon yielding of the other clutch.

18. A lever mechanism comprising a lever, two push rods connected to the lever at unequal distances from its pivot, and convergently extending from the lever, a drive member for the push rods, clutches transmitting the drive from said member to the rods, one effective on its associated rod under certain stress conditions and the other effective on its associated rod under different stress conditions, and means carried by said member for directly driving the rod affording greater leverage, in the event of failure of the clutch mechanism.

19. A lever mechanism comprising a pivotal lever, an actuating element for the lever, alternative connections from said element to the lever, engaging the lever at unequal distances from its pivot, means for effecting an automatic shift-over from one such connection to the other, according to load conditions, and means for establishing a drive through the greater leverage connection independently of the shift-over means, in case of failure of such means to act.

CHARLES A. SAWTELLE.